C. W. CROGAN.
TAPELINE TERMINAL.
APPLICATION FILED JULY 10, 1919.

1,438,903.

Patented Dec. 12, 1922.

C. W. Crogan.
Inventor

By Geo. P. Kimmel
Attorney

Patented Dec. 12, 1922.

1,438,903

UNITED STATES PATENT OFFICE.

CHARLES W. CROGAN, OF BANGOR, MAINE.

TAPELINE TERMINAL.

Application filed July 19, 1919. Serial No. 369,945.

*To all whom it may concern:*

Be it known that I, CHARLES W. CROGAN, a citizen of the United States, residing at Bangor, in the county of Penobscot and State of Maine, have invented certain new and useful Improvements in a Tapeline Terminal, of which the following is a specification.

This invention appertains to certain improvements in tape line measuring devices generally, and more particularly to a terminal construction therefor.

The principal object of the invention is to provide for a terminal device of the class mentioned, and one adapted to facilitate the measuring operations with a tape line by an individual, when the device is disposed in one of its operative positions, but which is capable of use by two or more persons as in the manner of the ordinary tape line terminal constructions, when the device is disposed in its other position of operation.

A further object of the invention is to provide for a tape line terminal as characterized, and one of a construction and arrangement capable of use for the taking of both inside and outside measurements with a degree of accuracy not heretofore obtainable in the known tape line and terminal structures of the prior art.

Another object of the invention is to provide for a one man tape line as hereinbefore mentioned, and one embodying the use of a terminal structure which may be readily engaged over the edge of an object, or engaged within an aperture carried by or formed in the object, or driven or otherwise forced into engagement with the surface of the object to be measured, or from which the measurement is to be taken, whereby one man may reel out the tape line for obtaining accurate measurements after the desired engagement of the terminal with the object.

A further object of the invention is to so construct this terminal that a ring forming part of the same may be rotatably mounted so that a hook carried thereby may be swung to one side of the tape line when the line is used for inside measurement, or otherwise manipulated by more than one person, such as is necessary for the obtaining of accurate measurements, which are designed to be taken from the periphery of the ring only, inasmuch as the said hook is slightly off-set from the periphery thereof and has its inner face only disposed in line therewith.

Another object of the invention is to so construct this terminal that it may serve to limit inward movement of the tape line into the casing.

Figure 1:
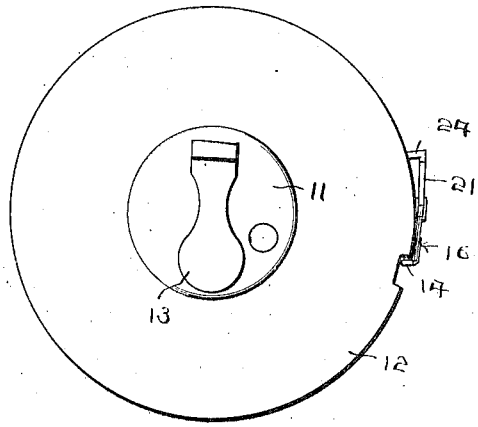
Figure 2:
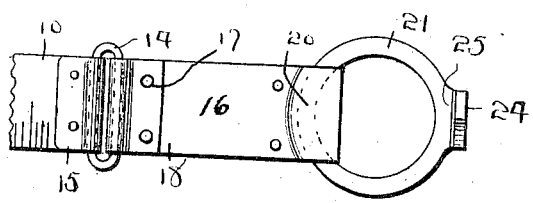
Figure 5:
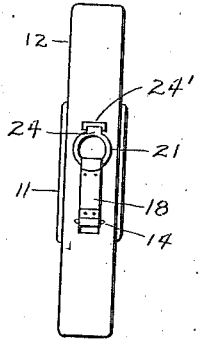
Figure 3:
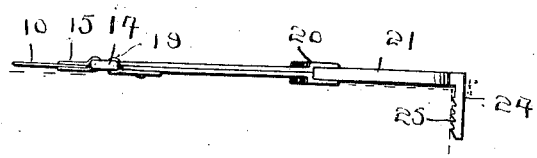
Figure 4:
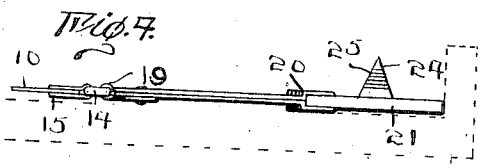

This invention is illustrated in the accompanying drawings, wherein:

Figure 1 is a view showing a tape line casing with the improved terminal connected with the tape line, Figure 2 is an enlarged view showing the improved terminal in plan, Figure 3 is a view in elevation showing the manner of using the terminal in outside measurement, Figure 4 is a view somewhat similar to Figure 3 showing the terminal turned to one side for inside measurement.

This terminal is for use in connection with a tape line 10 which will be wound upon a suitable drum 11 operatively mounted in a casing or housing 12 and provided with the usual handle 13 by means of which the drum may be rotated to wind the tape upon this drum. This terminal is pivotally connected with the tape line through the medium of an eye 14 connected with the line by means of a clip 15. A carrier indicated in general by the numeral 16 is formed from a strip of metal bent intermediate its length and having its end portions extending in overlanding relation and secured by rivets 17, thus providing a shank 18 which may be of any desired length and which is offset at its inner end to provide an eye or a bearing sleeve 19 through which the eye 14 passes. The forward end portion of the carrier 16 is offset to provide a hollow head 20, formed by extending portions of the strip in spaced relation, which receives the ring 21. The inner wall of the head is curved to provide an accurate bearing face which engages the ring 21 and prevents sliding movement of the ring longitudinally of the head but permits easy rotation of the ring so that the ring may be turned to position the hook 24 in alignment with the carrier or to one side thereof as shown in Figures 3 and 4. It should be noted that the inner face of this hook is provided with gripping teeth 25 so that the hook may obtain a firm grip upon the end of a board or other articles being measured thus preventing slipping. It should be noted that the hook is somewhat offset so that the inner face of the hook will be positioned flush with the outer periphery of the ring and that therefore a point upon the tape line will be the same distance from the inner face of the hook as it will be from the outer periphery of the ring, whereby absolute accuracy obtains in the taking of measurements from the outside of an object, when engaged by the inner face of the hook 24, and from the inside of an object, when abutted by the periphery of the ring 21. From the above description it will be readily apparent that when used for outside measurement the ring will be turned to position the hook as shown in Figures 2 and 3 and the end of the board or other articles to be measured engaged by the hook. It will be further apparent that if the line is to be used for measuring from the inner face of an upstanding flange or wall the ring will be turned to position the hook to one side and the outer periphery of the ring then brought into engagement with the flange or wall as shown in Figure 4. It is of course understood that this invention is not limited to application to a tape line wound upon a drum within a casing as it may be connected with one end of any tape line.

The casing 12 is provided with a recess or aperture to receive the terminal of the hook 24 when the carrier is folded back against the periphery of the casing thus securing the carrier in position as shown in Figure 1.

What is claimed is:

1. In combination with a tape line of a carrier formed from a strip bent at a point intermediate its length and having its end portion extended in overlapping relation and connected to provide a shank having a bearing sleeve at one end, the sections of the strip forward of the shank being positioned in spaced relation to provide a head, a ring positioned in the head, a hook extending at rightangles to the plane of the ring and offset to position its innerface flush with the outer periphery of the ring, and means loosely connecting the shank of the carrier with the tape line.

2. The combination with a tape line of a carrier connected at one end with one end of the tape line and having its free end portion provided with a housing having walls positioned in spaced relation, a ring positioned in the housing so as to turn about its own axis and a hook extending from the ring at rightangles to the plane thereof and offset to position its innerface flush with the outer periphery of the ring.

3. A tape line terminal comprising a carrier adapted for connection with one end portion of a tape line, a ring having loose connection with the carrier for turning movement about its own axis, and a hook extending from the ring and arranged to project laterally of the side face of the carrier and movable with the ring to attaching position, said ring being movable to a position to cause a portion of the circumferential edge remote from said hook to be presented for abutment with an object.

4. A tape line terminal comprising a carrier adapted to be secured at one end to the free end of a tape line and having its other end offset to provide a hollow head substantially rectangular in cross section, said head extending transversely with respect to the carrier and having that side wall thereof remote from the other end of said carrier arcuate throughout and constituting a bearing surface, and an object abutting ring mounted in said head and sliding against said surface, said head permitting of the turning movement of the ring in the plane of the tape line.

5. A tape line terminal comprising a ring adapted to be pivotally connected with the outer terminal of a tape line, and a hook offset laterally with respect to the peripheral edge of said ring so that the inner face of the hook is tangential to said edge, said hook extending at right angles with respect to the plane of the ring.

6. A tape line terminal comprising a ring adapted to be pivotally connected with the outer terminal of a tape line, a hook offset laterally with respect to the peripheral edge of said ring and extending at right angles with respect to the plane of the ring, said hook being triangular in contour so that the inner face of the hook is tangential to the edge, said hook having its inner face toothed.

In testimony whereof, I affix my signature hereto.

CHARLES W. CROGAN.